No. 770,884. PATENTED SEPT. 27, 1904.
J. E. ZIMMERMAN.
TOY.
APPLICATION FILED FEB. 24, 1904.
NO MODEL.
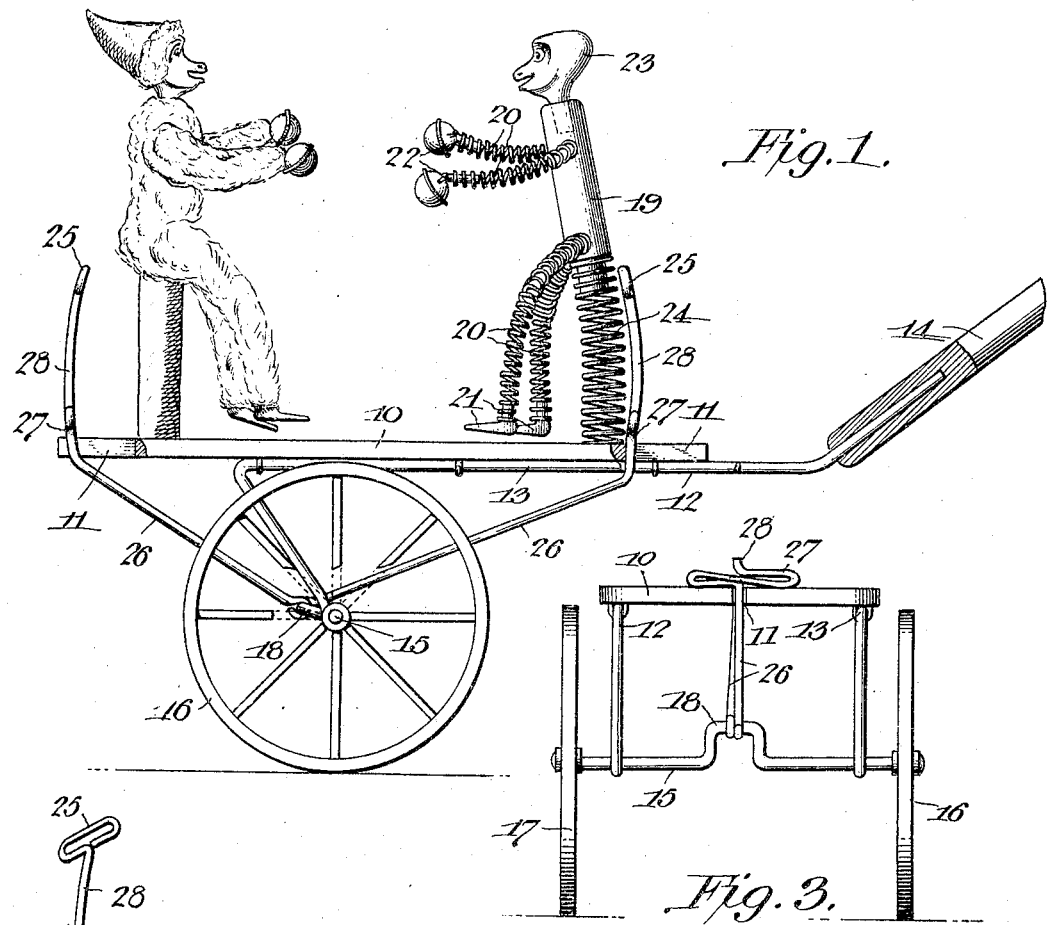
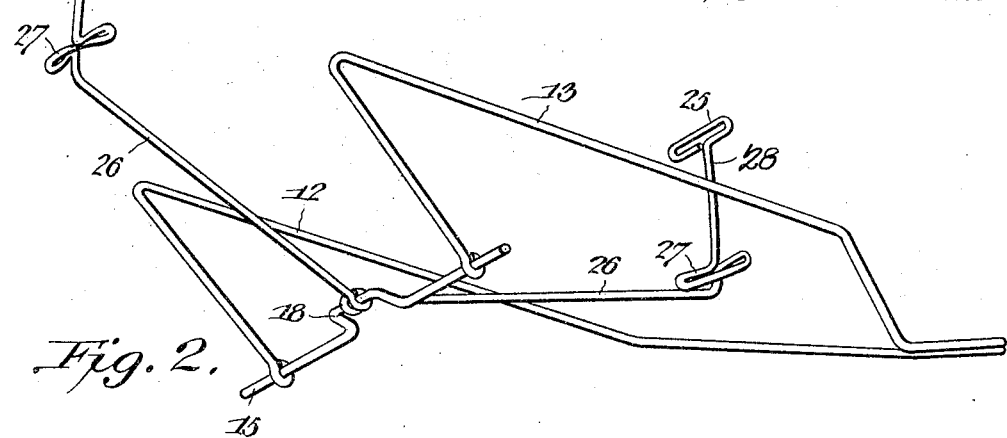
Witnesses
E. F. Stewart
C. K. Woodward
John E. Zimmerman, Inventor.
by C. A. Snow & Co.
Attorneys No. 770,884.  
Patented September 27, 1904.

UNITED STATES PATENT OFFICE.

JOHN E. ZIMMERMAN, OF TRINIDAD, COLORADO.

TOY.

SPECIFICATION forming part of Letters Patent No. 770,884, dated September 27, 1904.

Application filed February 24, 1904. Serial No. 195,084. (No model.)

*To all whom it may concern:*

Be it known that I, JOHN E. ZIMMERMAN, a citizen of the United States, residing at Trinidad, in the county of Las Animas and State of Colorado, have invented a new and useful Toy, of which the following is a specification.

This invention relates to that class of children's toys wherein figures are supported upon a platform for movement over the floor or ground and having means operative by the movement of the platform for imparting motion to the figures, and has for its object to produce a simply-constructed and improved arrangement of such devices whereby the natural movements of animals or human beings are vividly imitated as the device is moved.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a side elevation of the improved toy, parts being broken away to illustrate the construction of one of the figures and the guide for the operating device therefor. Fig. 2 is a perspective view of the platform-support, cranked axle, and figure-moving bars detached from the platform. Fig. 3 is a rear elevation of the platform and supporting-frame and a portion of the figure-operating means.

The improved device comprises a supporting-platform 10, of any suitable material and of any desired shape or form and having longitudinal slots 11 in one or both ends. The platform has connected to its under side spaced rods 12 13, converging in advance of the platform and united in a draft-tongue 14 and with their other ends bent downward and formed with eyes for rotatively supporting an axle 15, having bearing-wheels 16 17 rigidly connected to its ends. The axle has an intermediate crank 18.

Mounted upon the platform 10 is one or more figures of any desired form representing animals, human beings, or other animate or inanimate objects. The figures will preferably be formed with a body portion and resilient arms and legs and supported from the platform by a resilient support, so that when agitated the arms and legs will move about in imitation of the natural movements of the animal or person which they represent. For the purpose of illustration two apes are selected, one with clothing or covering thereon and the other representing the framework only. The figures consist of a body portion 19, of any suitable material, such as wood, and legs and arms 20, of coiled wire, terminating in feet 21 and hands 22 or other objects, and with a head 23, the whole figure being provided with any desired form of dress or covering in imitation of the skin of the animal. The body portion 19 is supported from the platform by a coiled-wire support 24, and when thus constructed and the covering or clothing applied any agitation of the figure will cause the arms and legs and the body portion to move in a very life-like and vivid manner.

Supported for longitudinal movement in the slots 11 are arms 28, one for each of the figures and bearing against the same by their upper ends 25 and with their lower ends connected by rods 26 to the crank 18. At the point where the arms 28 pass through the slots 11 they are provided with lateral stops 27 to bear upon the adjacent portions of the platform and limit the downward movement of the arms. The arms 28 and rods 26, together with the upper bearing ends 25 and stops 27, will preferably be in one single piece of wire bent into the proper shape, as shown. By this simple arrangement it will be obvious that the drawing of the platform over the floor or ground will cause the rotating bearing-wheels and cranked axle to impart a reciprocatory motion to the arms 28 and impart a rapid agitation to the figures on the platform and cause them in turn to be rapidly thrown about, with the effect of imparting thereto the desirable vivid imitation of the natural movement of the animals which they represent.

The whole device is very simple in construction, easily operated, and may be varied in form to represent different objects, animals, or persons without departing from the principle of the invention or sacrificing any of its advantages.

Having thus described the invention, what is claimed is—

1. A toy comprising a wheel crank-axle, a platform carried thereby, a helical spring rising from the platform, a figure seated upon the top of the spring and provided with resilient members, an upright arm working in the slot in the platform in alinement with and independently of the figure, and a connecting-rod extending between the crank of the shaft and the arm, the figure being disposed in the path of the arm for contact thereby to impart motion to the figure.

2. A toy comprising a wheel crank-axle, standards rising from the axle, rods extending forwardly from the standards, a draft device connected to the forward ends of the rods, a slotted platform supported upon the rods, a helical spring rising from the platform, a figure seated upon the top of the spring and having resilient members, an upright arm working in the slot in the platform and having a stop located at the top of the platform to limit downward movement of the arm, and a connecting-rod extending from the crank of the axle to the arm, the figure being located in the path of the arm for contact thereby to impart movement thereto.

3. A toy comprising a wheel crank-axle, a platform supported upon the axle and provided with front and rear alined slots, helical springs rising from the platform at the inner ends of the respective slots, figures seated upon the springs and facing inwardly toward each other, upright arms working in a direction longitudinally of the platform with their lower ends in the respective slots, and connecting-rods extending from the crank-shaft to the respective arms, the figures being located in the paths of the arms for contact thereby to impart motion to the figures.

4. A toy comprising a wheel crank-axle, a platform supported thereby, resilient supports rising from the platform at opposite sides of the axle, figures seated upon the resilient supports, and means independent of and coöperating with the respective figures and connected to the crank of the axle to alternately strike and impart vibrating movements to the figures.

In testimony that I claim the foregoing as my own I have hereto affixed my signature in the presence of two witnesses.

JOHN E. ZIMMERMAN.

Witnesses:
L. R. GOTTLIEB,
H. M. ZIMMERMAN.